(12) United States Patent
Bonham, III

(10) Patent No.: US 10,532,689 B2
(45) Date of Patent: Jan. 14, 2020

(54) RAMP SYSTEM AND METHOD THEREOF

(71) Applicant: Robert Ray Bonham, III, Chadds Ford, PA (US)

(72) Inventor: Robert Ray Bonham, III, Chadds Ford, PA (US)

(*) Notice: Subject to any disclaimer, the term of this patent is extended or adjusted under 35 U.S.C. 154(b) by 89 days.

(21) Appl. No.: 15/688,344

(22) Filed: Aug. 28, 2017

(65) Prior Publication Data

US 2019/0061594 A1 Feb. 28, 2019

(51) Int. Cl.
*B60P 1/43* (2006.01)
*B62D 63/08* (2006.01)

(52) U.S. Cl.
CPC ............... *B60P 1/43* (2013.01); *B62D 63/08* (2013.01)

(58) Field of Classification Search
CPC .... A61G 3/061; B65G 69/28; B65G 69/2811; B65G 69/30; B61D 47/005; B60P 1/43; B60P 1/435; B60P 1/433; B60P 1/436; B66F 7/243
See application file for complete search history.

(56) References Cited

U.S. PATENT DOCUMENTS

| | | | |
|---|---|---|---|
| 5,649,732 A * | 7/1997 | Jordan ...................... | B60P 1/43 296/26.1 |
| 6,769,583 B1 * | 8/2004 | Gordon .................... | B60R 9/06 224/402 |
| 8,051,519 B1 * | 11/2011 | Adams ...................... | B60P 1/43 14/69.5 |
| 2005/0263555 A1 * | 12/2005 | Hail ......................... | B60P 1/43 224/402 |
| 2011/0061182 A1 * | 3/2011 | Istre ......................... | B60P 1/43 14/69.5 |
| 2014/0338137 A1 * | 11/2014 | Stokes ..................... | B60D 1/06 14/71.1 |

* cited by examiner

*Primary Examiner* — Glenn F Myers
(74) *Attorney, Agent, or Firm* — Caesar Rivise, PC

(57) ABSTRACT

A method of providing a ramp system, said method comprising the steps of: providing a plurality of ramp members that are adapted to be coupled to a rigid portion of a trailer, wherein a first of the ramp members extends from the rigid portion of the trailer to a flat surface of an automotive vehicle that is attached to the trailer for pulling said trailer, wherein the second ramp member extends from the rigid member to a flat surface of the trailer, an incline exists from where the second member touches the flat surface of the trailer to where the first member touches the flat surface of the automotive vehicle; permitting the first ramp member to pivot from the flat surface of the automotive vehicle to a more vertical first orientation; and permitting the first ramp member to lock in the more vertical position.

10 Claims, 7 Drawing Sheets

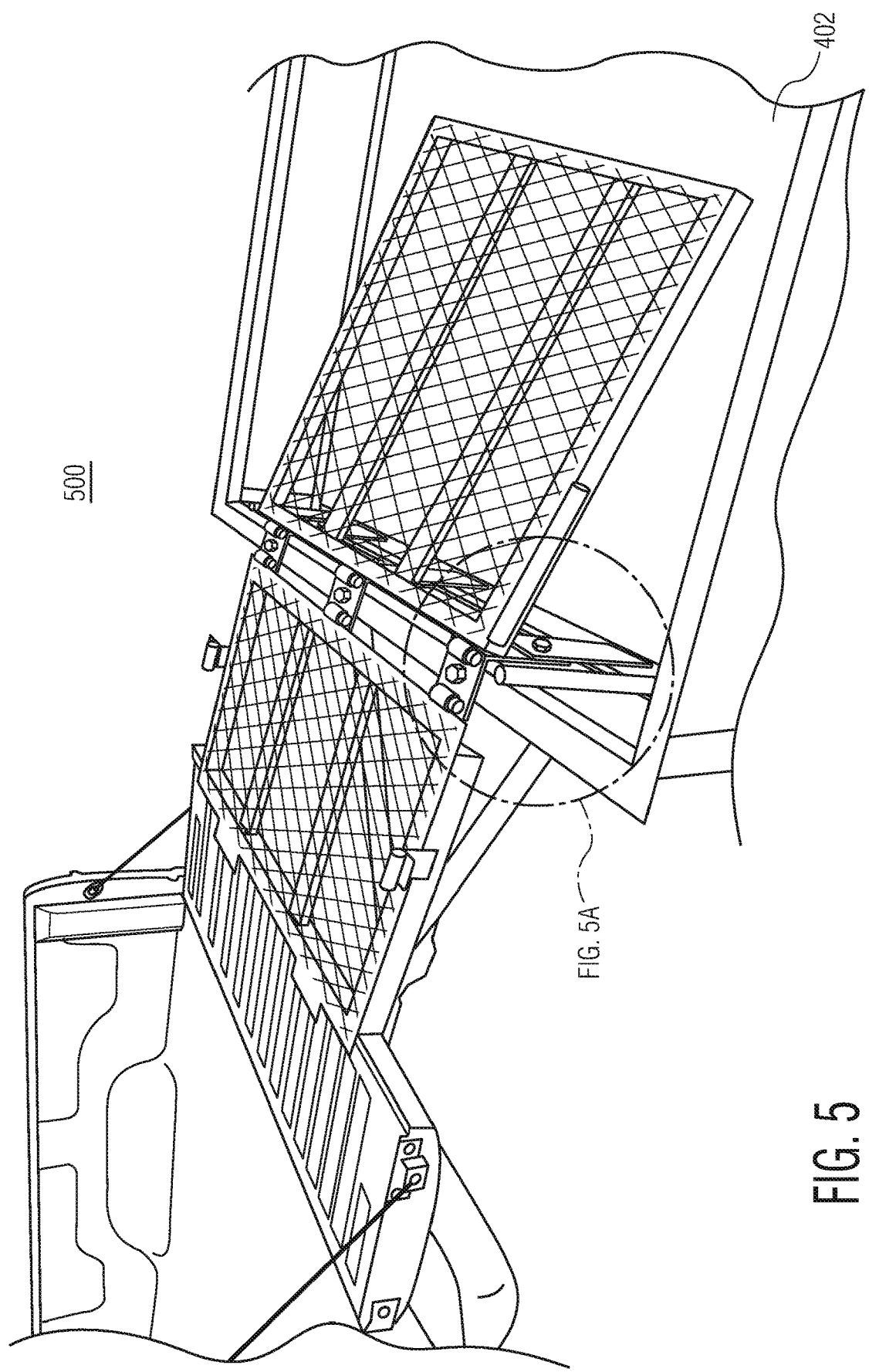

RAMP SYSTEM AND METHOD THEREOF

FIELD OF THE INVENTION

The present invention relates to trailers and more specifically to ramps for use with trailers. In particular, a ramp system is described that enables vehicles to be driven from a trailer onto a vehicle that is pulling the trailer.

BACKGROUND OF THE INVENTION

FIG. 6 illustrates a trailer 400, a very well-known type of equipment, that allows objects to be easily transported in a convenient manner. A trailer may be comprised, for example, of a metallic frame made from a material such as steel or aluminum. A trailer has wheels that extend from the frame and that allow the trailer to be rolled. Some trailers include a trailer floor 402 which is typically flat and which is able to support various cargo such as small vehicles. Exemplary small vehicles which may be transported on a trailer include a tractor and a ride-on lawnmower. At one end of such a trailer, a ramp is usually provided. The ramp is able to pivot on the edge of the trailer and as such is able to meet the ground. In this manner, a vehicle may be driven up the ramp and onto trailer floor 402. At another end of the trailer opposite the ramp, a connecting bar 450 is normally included. Connecting bar 450 extends from trailer 400 to a hitch 310 which is attached to the rear of vehicle 300 that is pulling (or towing) trailer 400. The attachment to the hitch 310 normally includes a pivoting mechanism 460 so that the trailer can easily go around curves as it is being pulled.

Some trailers include a horizontal rail 404 which may extend along some or all sides of the trailer. The horizontal rail 404 may be supported by vertical rails 406 which extend from the frame and support the horizontal rail 404 at a predetermined distance above the trailer floor 402. The horizontal rail 404 may help to keep objects such as vehicles that have been driven up and onto the trailer 400 in place, so that the objects do not fall while the trailer is being pulled.

In practice, after a vehicle has been driven up the ramp and onto the trailer floor 402, the ramp may be pivoted way from the ground and placed into a substantially vertical position. In that substantially vertical position, the ramp may be locked into place. By locking the ramp into place at a substantially vertical position, vehicles that are sitting on the trailer floor 402 are further prevented from falling off of the trailer 400.

Trailers typically have a trailer floor 402 of nonadjustable dimensions. An exemplary trailer is a Carry-On Trailer 5 ft.×8 ft. Open Mesh-Floor Trailer. Once the capacity of the trailer floor 402 has been reached, further vehicles may not be stored on the trailer 400.

SUMMARY OF THE INVENTION

A method of providing a ramp system, said method comprising the steps of: providing a plurality of ramp members that are adapted to be coupled to a rigid portion of a trailer, wherein a first of the ramp members extends from the rigid portion of the trailer to a flat surface of an automotive vehicle that is attached to the trailer for pulling said trailer, wherein the second ramp member extends from the rigid member to a flat surface of the trailer, permitting the first ramp member to pivot from the flat surface of the automotive vehicle to a more vertical first orientation; and permitting the first ramp member to lock in the more vertical position.

A ramp system comprising: a first ramp having a first ramp hinged end and first ramp free end opposite the first ramp hinged end; a second ramp having a second ramp upper end and a second ramp free end opposite the second ramp upper end; the second ramp upper end and the first ramp hinged end between the first ramp free end and the second ramp free end; the ramp system transitional between two positions: a loading position and a storage position in which said first ramp member is inclined more than it is inclined in said loading position; and a lock for locking said first ramp in said storage position.

BRIEF DESCRIPTION OF THE DRAWINGS

FIG. 5 is a perspective drawing which illustrates a further exemplary embodiment of the present invention with particular regard to how exemplary ramps are coupled to an exemplary trailer.

DETAILED DESCRIPTION

Figure 6:
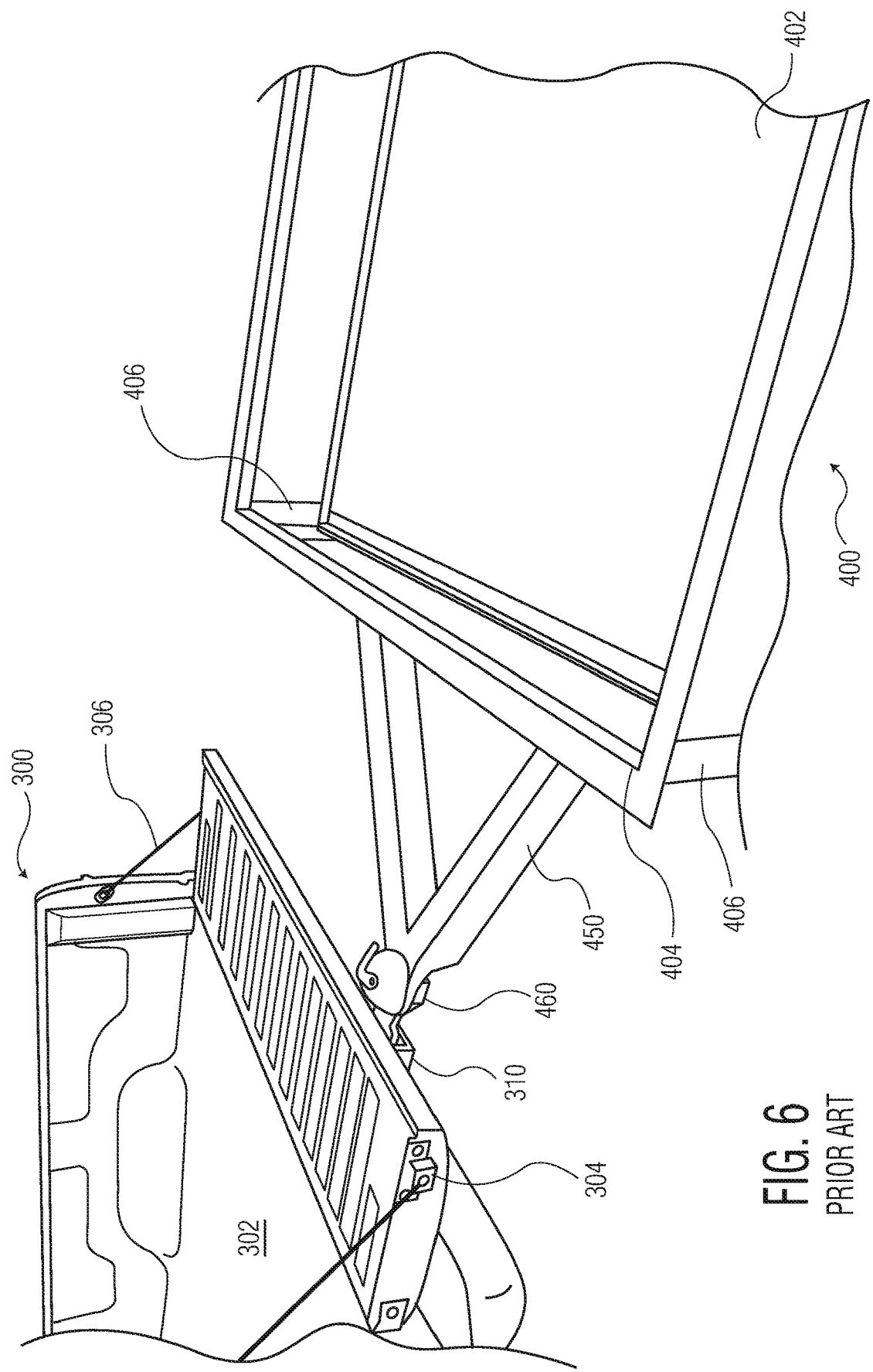
FIG. 6 is a perspective drawing of a prior art trailer that is being towed by another vehicle.

As previously explained, the trailer 400 is typically pulled by means of a vehicle such as a truck 300. One type of truck 300 that may be used to pull trailer 400 is referred to as a pickup truck. Pick up truck 300 includes a cab with typically (but not always) a single row of seats from which a driver may operate the truck and one or 2 passengers may sit, and a flatbed 302 behind the cab in which objects may be transported. At the rear of the pickup truck, a vehicle rear 304 may be found. The vehicle rear is typically a type of hinged door that pivots downwards a total of 90° to create a continuous flat surface with the flatbed. Vehicle rear retainer 306 maintains vehicle rear 304 in the open position shown in FIG. 6.

The trailer 400 is attached to the truck 300 that is pulling (or towing) it, usually via a connecting bar 450. The connecting bar 450 extends from the front of the trailer and is coupled to the truck that is towing the trailer via a trailer hitch 310. However, there is typically a predetermined distance between the rear of the truck and the front of the trailer. This distance is desirable to enable the trailer 400 to pivot as the truck with the trailer 400 in tow goes around curves. An exemplary distance between the front edge of the trailer floor 402 and the rear edge of vehicle rear 304 may be 5 feet.

As previously explained, the trailer 400 has only a limited amount of space which may be used for transporting objects. A pickup truck 300 also has space in the bed 302 for transporting objects. Thus, if vehicles are being transported by the trailer, it is desirable for the flatbed 302 of the pickup truck 300 to be used for transporting vehicles as well. There are several problems with this proposal. 1$^{st}$, as explained above, the front edge of trailer floor 402 is typically several feet back from the rear edge of vehicle rear 304. Thus, pushing or driving a vehicle from the trailer floor 402 to the flatbed 302 of the pickup truck would be very difficult because of the space between them. Furthermore, it would be very inconvenient to somehow try to push the trailer 400 so that the front edge of trailer floor 402 is immediately adjacent to the rear of vehicle rear 304. This difficulty is a result of the fact that the connecting bar 450 maintains the trailer floor 402 at a distance from the rear edge of vehicle rear 304.

In addition, as previously explained, many trailers include horizontal rails 404 which are maintained a vertical distance above the trailer floor 402 by vertical rails 406. The horizontal rails 404 effectively form a barricade between the trailer floor 402 and the flatbed 302 of the pickup truck 300.

Furthermore, the flatbed 302 of a pickup truck 300 is typically much higher off the ground than the trailer floor 402. Thus, even if there was some way to move the trailer 400 so that the front edge of the trailer floor 402 was touching the rear edge of vehicle rear 304, the distance in height between the trailer floor 402 and vehicle rear 304 (when opened) would make moving a vehicle from the trailer floor 402 to the flatbed 302 extremely difficult.

Figure 1:
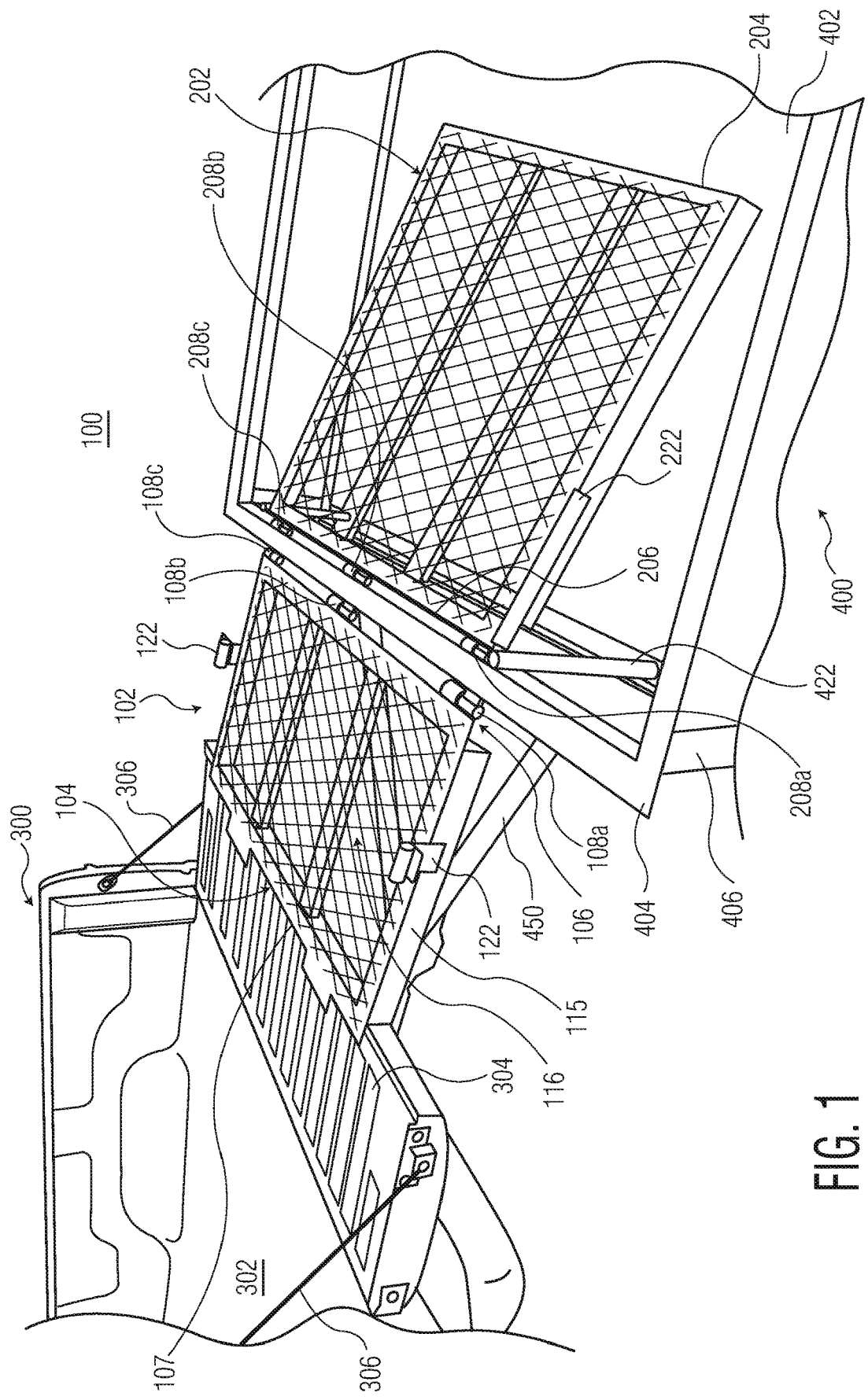
FIG. 1 is a perspective drawing of a ramp system in accordance with an exemplary embodiment of the present invention.

FIG. 1 is a perspective drawing of a ramp system 100 in accordance with an exemplary embodiment of the present invention. FIG. 1 illustrates vehicle 300 that is towing trailer 400 via connecting bar 450. Ramp system 100 includes $1^{st}$ ramp member 102 and $2^{nd}$ ramp member 202. Each ramp member will be discussed separately.

As previously explained, a substantial gap exists between trailer floor 402 and flatbed 302. This distance between the two surfaces is a combination of a horizontal separation and a vertical separation. Thus, for example, standing alongside vehicle 300 and trailer 400, the gap between the rear edge of vehicle rear 304 and the front edge of trailer floor 402 is partially caused by the horizontal distance therebetween. Furthermore, as previously explained, trailer floor 402 and flatbed 302 are typically a different distance off of the ground. Thus, one of the objectives of the present invention is to create one or more surfaces that allow vehicles to roll from trailer floor 402 to flatbed 302. As illustrated in FIG. 1, $1^{st}$ ramp member 102 and $2^{nd}$ ramp member 202 are provided for the purpose of permitting such rolling from trailer floor 402 to flatbed 302 to occur. As explained below, there are several exemplary embodiments in which $1^{st}$ ramp member 102 and $2^{nd}$ ramp member 202 are provided. Each embodiment will be discussed in turn.

$1^{st}$ ramp member 102 is comprised of several parts. In the exemplary embodiment shown in FIG. 1, $1^{st}$ ramp member 102 is a single steel grating. Steel grating 102 may have structural members for support, including structural members along its sides, structural members away from its sides, structural members that criss-cross steel grating 102, etc. Steel grating 102 may have various dimensions, although in the example shown in FIG. 1, steel grating 115 is of sufficient width so that it bridges the gap between vertical rail 404 and the back most edge of vehicle rear 304. While in the example shown in FIG. 1, steel grating 115 has fixed dimensions, in an alternative embodiment, the dimensions of steel grating 115 may be variable. It is understood, for example, that steel grating 115 can be made of two parts, one that is attached to and slides under the other, in order to adjust the dimensions of steel grating 115.

Steel grating 115 is merely exemplary of the material that may be used for $1^{st}$ ramp member 102. Other materials may be used as well, such as aluminum. Alternatively, a material such as carbon composite may be used. In a further exemplary embodiment, $1^{st}$ ramp member 102 may be made of a resin with sufficient strength to support a vehicle being driven there on.

Steel grating 115 is shown comprised of a material in a "diamond" pattern but this is merely exemplary. Thus, steel grating 115 may be completely solid, a grating with spaces therein, some other pattern with spaces therebetween, etc.

Grating 115 thus provides $1^{st}$ ramp surface 116. $1^{st}$ ramp surface 116 is preferably smooth, although this is merely exemplary. $1^{st}$ ramp surface 116 may be flat, may include openings, may include ridges, etc.

Figure 2:
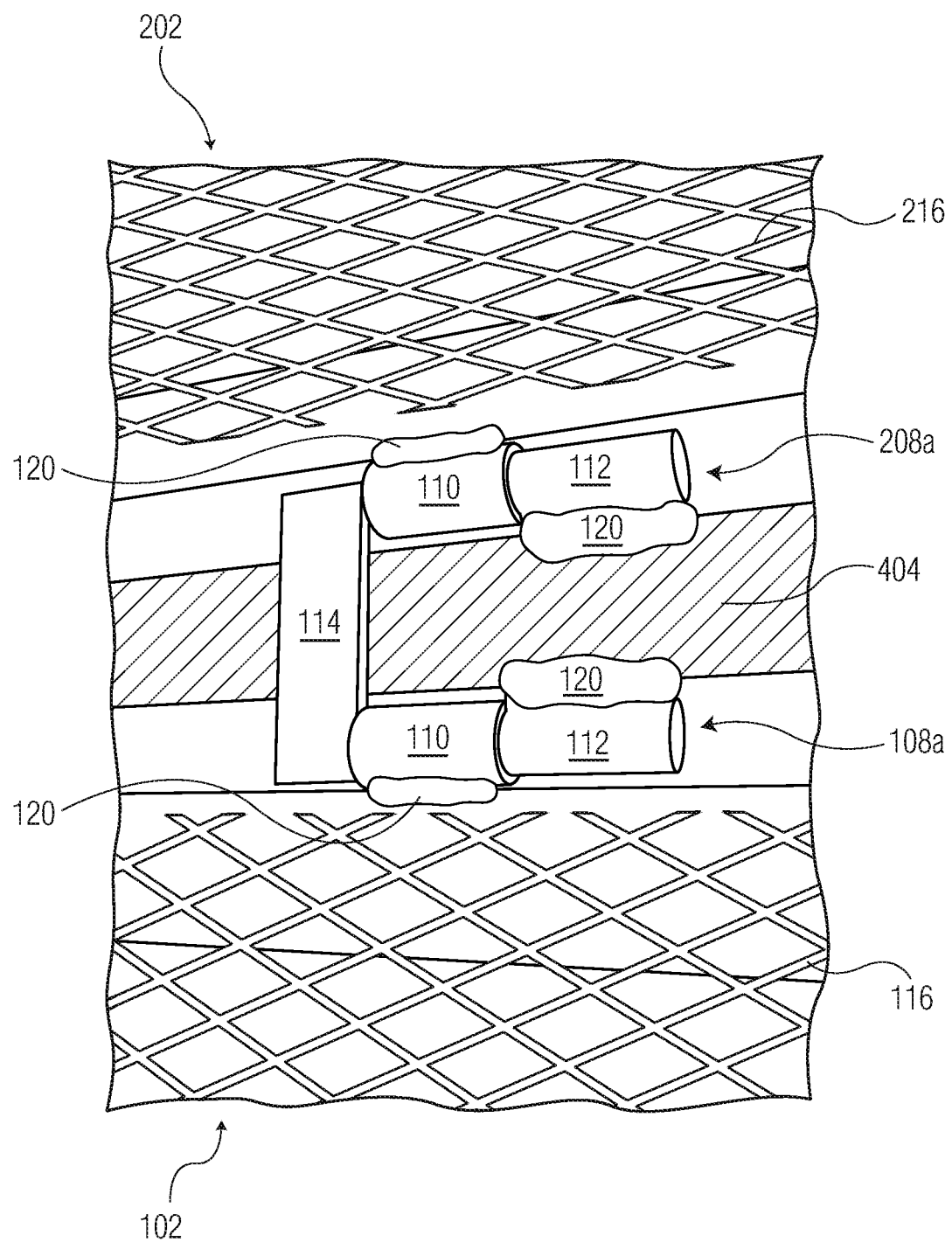
FIG. 2 is a drawing which illustrates the hinges that are illustrated in FIG. 1 from an overhead orientation.

In one exemplary embodiment, $1^{st}$ ramp member 102 is attached to horizontal rail 404 via hinges 100 8A, B, and C. A magnified view of hinge 108a is illustrated in FIG. 2. Hinge 108a is comprised of pin 110 which rotates within knuckle 112. As shown in FIG. 2, pin 110 is welded to $1^{st}$ ramp surface 116 via welding joint 120. Knuckle 112 is welded to horizontal rail 404 via welding joint 120. Pin 110 includes a projection which resides within and pivots within knuckle 112. Retainer 114 is attached to horizontal rail 404 and extends past horizontal rail 404 on both sides in order to make contact with pin 110. In this manner, retainer 114 holds pin 110 within knuckle 112. Also in this manner, $1^{st}$ ramp member 102 is able to rotate relative to horizontal rail 404.

Returning to FIG. 1, $1^{st}$ ramp member 102 is in a position to create a substantially flat surface between horizontal rail 404 and vehicle rear 304. $1^{st}$ ramp member 102 extension member 107 projects past the back most edge of vehicle rear 304. In this manner, extension member 107 allows $1^{st}$ ramp member 102 to be supported adjacent to vehicle rear 304. Vehicle rear 304 is maintained in the position shown in FIG. 1 by virtue of vehicle rear retainer 306. Vehicle rear retainer 306 may be, for example, a cable assembly of sufficient strength to maintain vehicle rear 304 in the position as shown when vehicles are rolling from $1^{st}$ ramp member 102 to flatbed 302. Put another way, in one embodiment, extension member 107 may form an upside down "L" shape. This "lip" may support first ramp member 102 on vehicle rear 304 so the height transition from first ramp member 102 to vehicle rear 304 is minimal. The embodiment is merely exemplary and alternative edge designs for first ramp member 102 may be used for enabling first ramp member 102 to be placed on (or over) a portion of vehicle rear 304.

After vehicles have been loaded or unloaded from flatbed 302, $1^{st}$ ramp member 102 may be rotated so that vehicle rear 304 can be in turn rotated in order to close vehicle rear 304. In this manner, flatbed 302 is secured and objects placed on flatbed 302 are prevented from falling off vehicle 300. In one exemplary embodiment, $1^{st}$ ramp member 102 is rotated into a vertical orientation, for example the orientation shown in FIG. 3. In another exemplary embodiment, $1^{st}$ ramp member 102 is rotated into a more vertical orientation than the orientation shown in FIG. 1.

FIG. 1 also illustrates $2^{nd}$ ramp member 202. In the exemplary embodiment shown in FIG. 1, $2^{nd}$ ramp member 202 is shown with hinges, however this is merely exemplary. A further non-hinged embodiment is described below.

$2^{nd}$ ramp member 202 may be made of any of the materials that were described with reference to $1^{st}$ ramp member 102, including steel, aluminum, carbon fiber, resin, etc.

In the embodiment shown in FIG. 1, hinges 208a, b, and c allow $2^{nd}$ ramp member 202 rotate. A magnified view of hinge 208a is shown in FIG. 2. Hinge 208a includes pin 110 which includes a protrusion which resides and rotates within knuckle 112. Retainer 114 is again attached to horizontal rail 404 and extends past horizontal rail 404 in order to make contact with pin 110 of hinge assembly 208a. In this manner, retainer 114 maintains pin 110 within knuckle 112. Hinge 208a thus allows $2^{nd}$ ramp member 200 to rotate.

In the embodiment shown in FIG. 1, $2^{nd}$ ramp free end 204 is resting on a trailer floor 402. $2^{nd}$ ramp upper end 206 is at substantially the same height off of the ground as the top of horizontal rail 404. $1^{st}$ ramp hinged end 106 is also at substantially the same height off of the ground as horizontal rail 404. Thus, $1^{st}$ ramp hinged end 106 and $2^{nd}$ ramp upper end 206 are at substantially the same height off of the ground. $1^{st}$ ramp free end 104, as previously explained, rests on the back most surface of vehicle rear 304. In this manner, the top surface of $1^{st}$ ramp free end 104 and the surface of vehicle rear 304 in the orientation shown in FIG. 1 are at substantially the same height off the ground (not including the thickness of extension member 107).

In the orientation shown in FIG. 1, a vehicle may be rolled or driven from a trailer 400 to vehicle 300. The progression of rolling or driving a vehicle is as follows: vehicle is driven up onto the trailer 400 via a ramp included with trailer 400 that meets the ground on which trailer 400 sits. The vehicle rolls across trailer 400 on trailer floor 402 until the vehicle reaches $2^{nd}$ ramp member 202. The vehicle rolls across $2^{nd}$ ramp member 202 until the vehicle reaches horizontal member 404. The vehicle rolls across horizontal rail 404 (the amount of time that the rolling vehicle is in contact with horizontal rail 404 may be very short, or might even be 0 if the top surface of horizontal rail 404 is slightly below the top surface of $1^{st}$ ramp hinged end 106 and $2^{nd}$ ramp upper end 206). The vehicle next rolls across $1^{st}$ ramp member 102 until the vehicle reaches vehicle rear 304. The vehicle then rolls across vehicle rear 304 until it reaches flat bed 302.

In one exemplary embodiment, vehicle 300 lacks vehicle rear 304. In such an exemplary embodiment, extension member 107 rests on the top surface of flat bed 302.

In another exemplary embodiment, extension member 107 is deleted and first ramp member 102 simply rests on vehicle rear 304 (or flatbed 302 if vehicle rear 304 is omitted).

In the exemplary embodiment shown in FIG. 1, $2^{nd}$ ramp member 202 is able to pivot upwards. Once pivoted, and subsequently placed in a locked position, $2^{nd}$ ramp member 202 is oriented in a vertical position. In a further exemplary embodiment, $2^{nd}$ ramp member 202 is oriented in a position which is more vertical than the position shown in FIG. 1.

In a further alternative embodiment, $2^{nd}$ ramp member 202 is not pivot. In one exemplary embodiment, $2^{nd}$ ramp member 202 is merely fixed and stays in the position shown in FIG. 1. In a further alternative embodiment, $2^{nd}$ ramp member 202 is maintained in the position shown in FIG. 1 by virtue of hooks that allow $2^{nd}$ ramp member 202 to be hooked to horizontal rail 404. In a further exemplary embodiment, $2^{nd}$ ramp member 202 may be unhooked and then dropped onto the trailer floor 402. In this manner, the top surface of $2^{nd}$ ramp member 202 is substantially parallel with the top surface of trailer floor 402 so that a vehicle can be parked over $2^{nd}$ ramp member 202.

In a further exemplary embodiment, another mechanical apparatus is used to raise and lower $2^{nd}$ ramp upper end 206. A vertical ratchet mechanism (not shown) for example may be used.

Figure 3:
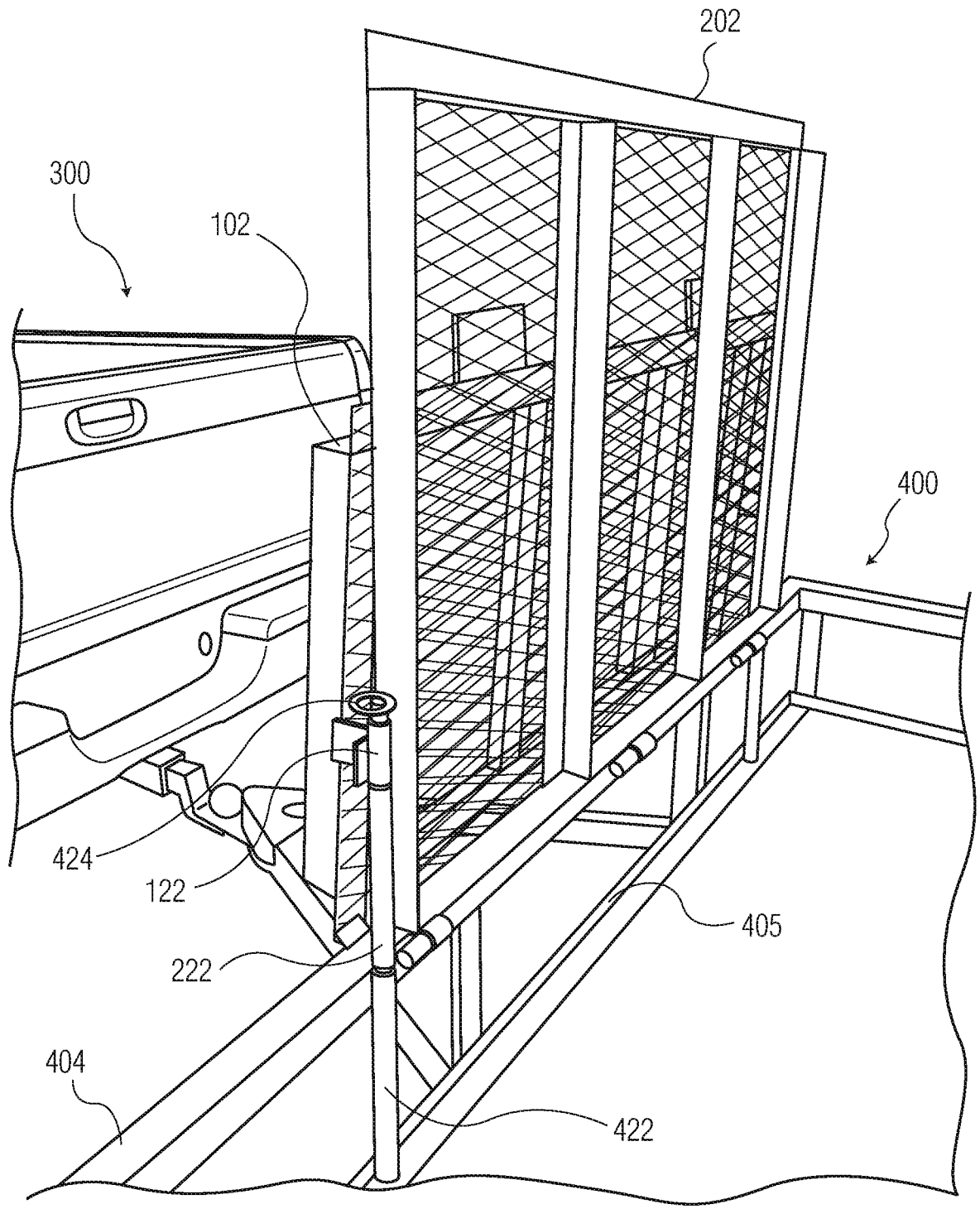
FIG. 3 is a perspective drawing of the ramp system shown in FIG. 1 with both ramps locked in a substantially vertical orientation.
Figure 4:
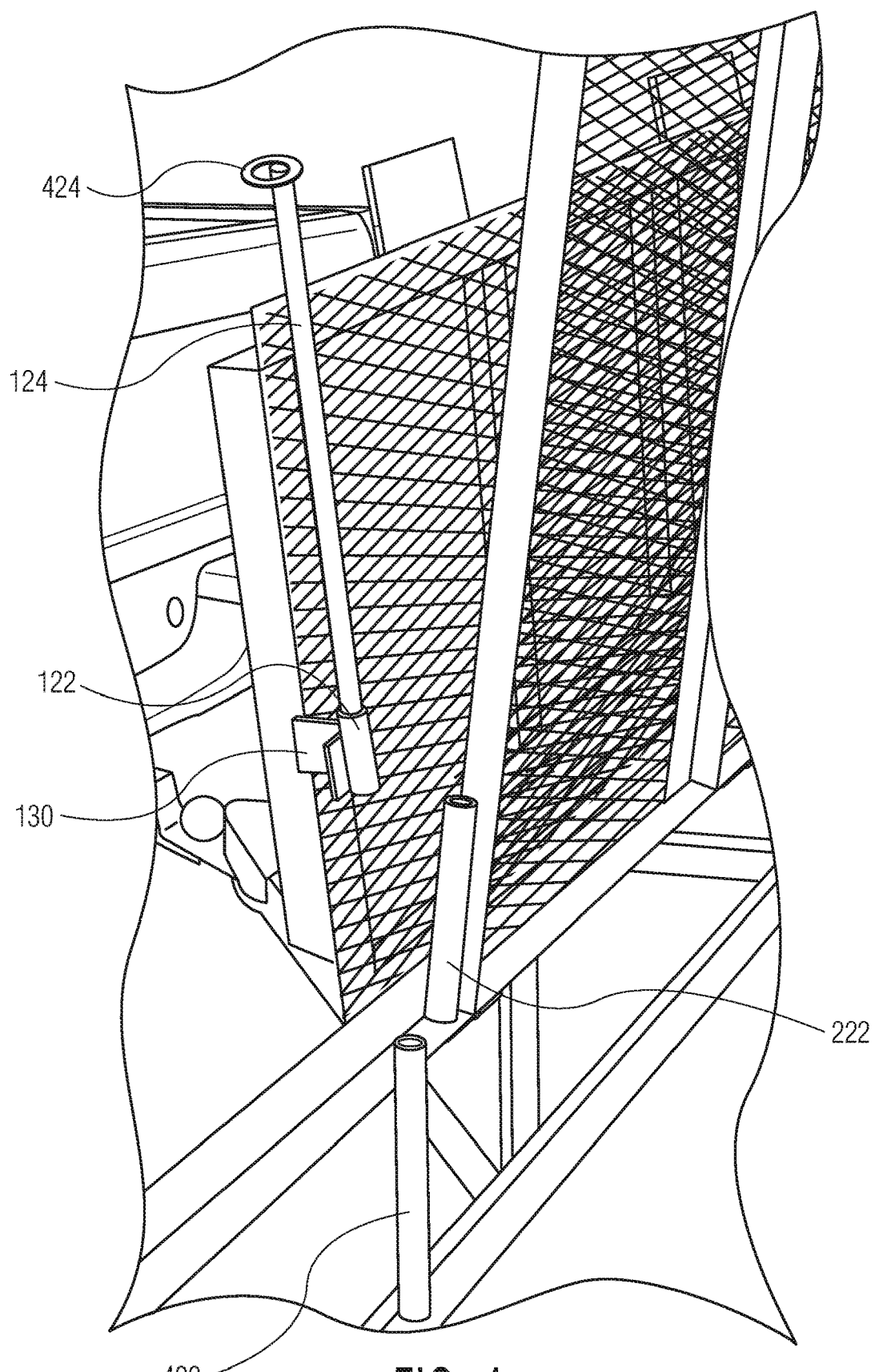
FIG. 4 is a perspective drawing which illustrates the ramp system shown in FIG. 3 after the Rams have been partially moved away from the orientation shown in FIG. 3.

The embodiment illustrated in FIG. 1 is useful for loading a vehicle onto truck 300 and unloading a vehicle from truck 300. Once vehicles have been loaded onto truck 300, however, the orientation of at least $1^{st}$ ramp member 102 is desirably changed so that vehicle 300 can be driven. FIGS. 3 and 4 illustrate exemplary embodiments of the present invention in which $1^{st}$ member 102 is rotated so that vehicle 300 may be driven. In the embodiment shown in FIGS. 3 and 4, $2^{nd}$ ramp member 202 has been rotated but this is merely an illustration of an exemplary embodiment. As previously explained, in some embodiments, $2^{nd}$ ramp member 202 is not rotated.

$1^{st}$ ramp member includes $1^{st}$ locking tube 122 which projects perpendicularly from an edge of $1^{st}$ ramp member 102. Trailer locking tube 402 is attached to trailer 400 as shown. In one exemplary embodiment, trailer locking tube 422 is welded to horizontal rail 404. FIG. 3 illustrates a further horizontal rail 405 (optional) that extends along trailer floor 402 at an edge of trailer floor 402. In one exemplary embodiment, trailer locking tube 422 is welded to further horizontal rail 405 as well.

When $1^{st}$ ramp member 102 is rotated into the position shown in FIG. 3, trailer locking pin 424 with shaft 124 is inserted into $1^{st}$ locking tube 122. Trailer locking pin 424 has sufficient length so that trailer locking pin 424 is able to extend into trailer locking tube 422. In this manner, $1^{st}$ ramp member 102 is maintained in the position shown in FIG. 3 (which is vertical, or more vertical than the position shown in FIG. 1).

If $2^{nd}$ ramp member 202 includes hinges, $2^{nd}$ ramp member 202 can be oriented into the position shown in FIG. 3. $2^{nd}$ ramp member 202 may include $2^{nd}$ locking tube 202 which is attached to an edge of $2^{nd}$ ramp member 202. Thus, in the orientation shown in FIG. 3, the respective openings inside $1^{st}$ locking tube 122, $2^{nd}$ locking tube 222, and trailer locking tube 422 coincide. Trailer locking pin 424 extends through $1^{st}$ locking tube 122, $2^{nd}$ locking tube 222, and trailer locking tube 422. In this manner, $1^{st}$ ramp member 102 and $2^{nd}$ ramp member 202 are maintained in the position shown in FIG. 3 (vertical, or more vertical than as shown in FIG. 1).

FIG. 4 illustrates $1^{st}$ ramp member 102 and $2^{nd}$ ramp member 202 transitioning from the configuration shown in FIG. 3 to the configuration shown in FIG. 1. Trailer locking pin 424 is pulled upwards so that it no longer penetrates $2^{nd}$ locking tube 222 and trailer locking tube 422. In this manner, $1^{st}$ ramp member 102 is able to pivot into the position shown in FIG. 1. $2^{nd}$ ramp member 202, if it includes hinges, is able to pivot into the position shown in FIG. 1, as well.

The locking mechanism shown in FIGS. 3 and 4 (to lock the ramp members in vertical or more vertical positions) is merely exemplary. It is understood that other locking mechanisms may be used. For example, vertical poles may extend upward from horizontal rail 404 and the ramp members may be simply chained to the vertical poles. Other methods of locking the ramp members may also be used.

Figure 5A:
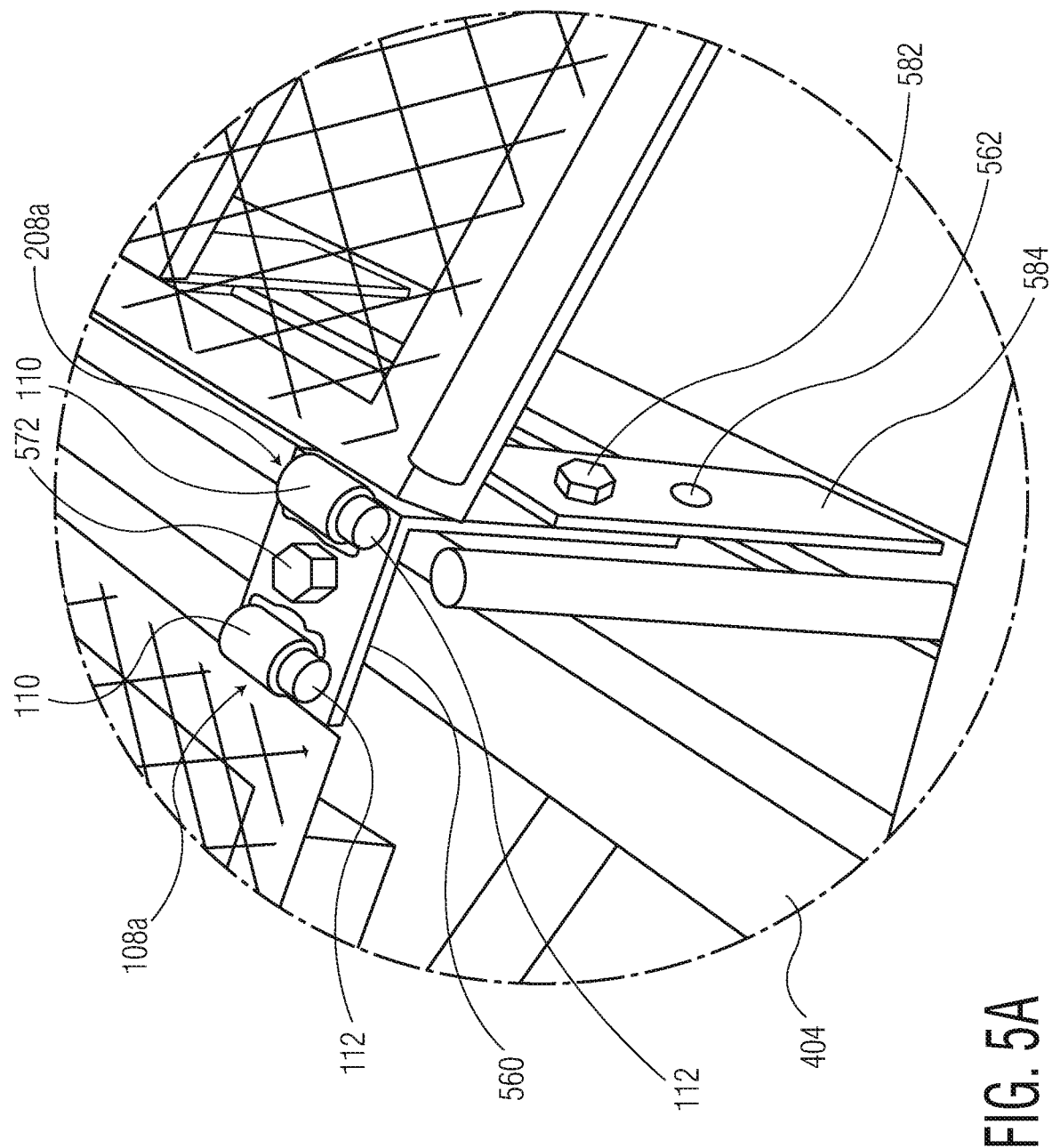
FIG. 5A is a magnified view of a portion of FIG. 5.

In FIGS. 1 and 2, hinges 108a,b, and c and hinges 208a, b and c are welded directly to horizontal rail 404. In a further exemplary embodiment of the present invention, the various hinges are welded to an L bracket and the L bracket may be attached to horizontal rail 404 using a coupling mechanism such as bolts. This exemplary embodiment is further described with reference to FIG. 5 and FIG. 5A. FIG. 5 illustrates an exemplary embodiment (that includes apparatus 500) in which L brackets are used to attach ramp system 100 to ramp 400. A magnified view of a portion of FIG. 5 is shown in FIG. 5A. In FIG. 5A, L bracket 560 is shown. L bracket 560 may be attached to horizontal rail 404 via bolt 572. Bolt 572 is shown extending through an opening in L bracket 560 and into horizontal rail 404. While bolt 572 extends through the top of horizontal rail 404, a further bolt (not shown) may extend through the side of L bracket 560 and into the side of horizontal rail 404. L bracket 560 extends towards trailer floor 402. Vertical member 584 may be attached to L bracket 560 via bolt 582. As vertical member 584 extends all the way to trailer floor 402, additional support for L bracket 560 is provided. Vertical member 584 may include a further opening 562 through which bolt 582 may extend. In use, bolt 582 is unscrewed from L bracket 560 as shown, vertical member 584 is slid upward, and bolt 582 is then screwed into opening and into L bracket 560 through the opening in which it previously resided. In this manner, vertical member 584 may be raised in order to adjust the distance between: L bracket 560 and trailer floor 402. In this manner, L bracket 560 may be used with trailers having various distances between horizontal rail 404 and trailer floor 402.

The various figures illustrate $1^{st}$ ramp member 102 as a single continuous object. $2^{nd}$ ramp member 202 is also illustrated as a single continuous object. It is understood that $1^{st}$ ramp member 102, $2^{nd}$ ramp member 202, or both may each be replaced with multiple ramp members. For example, $1^{st}$ ramp member 102 may be replaced with 3 ramp members with spaces therebetween, with each ramp member attached to and pivoting relative to a respective hinge 108$a,b$, and $c$. Alternatively, instead of replacing $1^{st}$ ramp member with three separate ramp members, two separate ramp members may be used, one ramp member for the wheels on each side of a vehicle being loaded onto flatbed 302. $2^{nd}$ ramp member 202 may also be replaced with multiple separate ramp members.

Flatbed 302 is a flat surface (or substantially a flat surface, i.e. it may have ridges). Vehicle rear 304 in the configuration shown in FIG. 1 is also a flat surface (or substantially a flat surface, i.e. it may have ridges). Together in the embodiment shown in FIG. 1, flatbed 302 and vehicle rear 304 together comprise a flat surface.

While the present invention has been described herein with reference to exemplary embodiments, it should be understood that the invention is not limited thereto. Those skilled in the art with an access to the teachings herein will recognize additional modifications, applications, and embodiments within the scope thereof and additional fields in which the invention would be useful.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein, it is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

PARTS LIST 100 ramp system
102 first ramp member
104 first ramp free end
106 first ramp hinged end
107 extension member
108$a,b,c$ hinge assembly
110 knuckle
112 pin
114 retainer
116 first ramp surface
130 extension
120 joint
122 first locking tube
202 second ramp member
204 second ramp free end
206 second ramp upper end
208$a,b,c$ hinge assembly
216 second ramp surface
222 second locking tube
300 vehicle
302 flat bed
304 vehicle rear
306 vehicle rear retainer
400 trailer
402 trailer floor
404 horizontal rail
405 further horizontal rail
406 vertical rail
422 trailer locking tube
424 trailer locking pin
450 connecting bar
560 L bracket
562 opening
572 bolt
582 bolt
584 vertical member

The invention claimed is:

1. A ramp system comprising:
a) a first ramp having a first ramp hinged end and first ramp free end opposite the first ramp hinged end;
b) a second ramp having a second ramp upper end and a second ramp free end opposite the second ramp upper end;
c) the second ramp upper end and the first ramp hinged end between the first ramp free end and the second ramp free end;
d) the ramp system transitional between two positions:
   a. a loading position; and
   b. a storage position in which said first ramp member is inclined more than it is inclined in said loading position; and
e) a lock for locking said first ramp in said storage position,
   wherein the first ramp and second ramp form a path from a flat surface of an automotive vehicle to a flat surface of a trailer being towed by said vehicle, said path enabling a vehicle to be transported from said flat surface of said trailer, over said second ramp, over said first ramp, and onto said flat surface of said automotive vehicle.

2. A ramp system according to claim 1, wherein said second ramp upper end is a second ramp hinged end, in said loading position said second ramp inclines from said second free end to said second hinged end, said second ramp is pivotable from said loading position to said storage position in which said second ramp is more vertical than when said second ramp is in said loading position.

3. A ramp system according to claim 1, wherein in the loading position the first ramp and the second ramp together form an incline rising from the second ramp free end to the first ramp free end.

4. A ramp system according to claim 1, wherein ends of said first ramp and said second ramp are each attached to a bracket, and said bracket is adapted to be attached to a rail that is attached to said trailer.

5. A ramp system comprising:
a plurality of ramps that pivot towards each other, the ramps lockable in upright positions, the ramp pivotable away from each other so that ends of the ramps furthest away from each other create an incline from one of the ends to another of the ends;
wherein the plurality of ramps include a first ramp and a second ramp, wherein the first ramp and second ramp form a path from a flat surface of an automotive vehicle to a flat surface of a trailer being towed by said vehicle, said path enabling a vehicle to be transported from said flat surface of said trailer, over said second ramp, over said first ramp, and onto said flat surface of said automotive vehicle.

6. A ramp system according to claim 5, wherein the ramps both pivot from a stationary member relative to the ramps, wherein the stationary member is between the ramps.

7. A ramp system according to claim 5, wherein the plurality of ramps are attached to a rail of a trailer from which the plurality of ramps pivot.

8. A ramp system according to claim 5, wherein the plurality of ramps are attached to a bracket from which the ramps pivot, wherein the bracket is attached to a rail of a trailer.

9. A ramp system according to claim 1, wherein said first ramp is lockable in said storage position without also locking said second ramp in said storage position.

10. A ramp system according to claim 5, wherein said first ramp is lockable in said storage position without also locking said second ramp in said storage position.

* * * * *